Jan. 18, 1955 W. E. TOLLES 2,700,135
PRODUCT-TAKING SYSTEM
Filed Aug. 25, 1944

INVENTOR
WALTER E. TOLLES
BY
ATTORNEYS

United States Patent Office 2,700,135
Patented Jan. 18, 1955

2,700,135

PRODUCT-TAKING SYSTEM

Walter E. Tolles, Mineola, N. Y., assignor to the United States of America as represented by the Secretary of the Navy Application August 25, 1944, Serial No. 551,238

6 Claims. (Cl. 332—47)

This invention relates to product-taking systems, and more particularly to systems for producing an output voltage proportional to the product of a number of varying input voltages.

In many measuring and computing instruments, it is necessary to determine the product of two or more measured quantities or to find the square or some other power of a single quantity. Such requirements are often found in systems which are of a predominantly electrical nature where a voltage proportional to the product of two or more input voltages or to the square or higher power of a single input voltage is to be obtained. Since systems of this general type are usually relatively complex, it is desirable that the squaring or product-taking circuits be made as simple as possible.

Accordingly, there is proposed a product-taking system comprising ring modulators for successively modulating a constant-frequency carrier with the varying input voltages to be multiplied, these voltages being either direct-current voltages or alternating-current voltages of relatively low frequency, and means for demodulating the output of the last of the modulating means to separate the carrier from the desired product voltage.

For a better understanding of the invention, reference is made to the accompanying drawing, in which.

Figure 1:
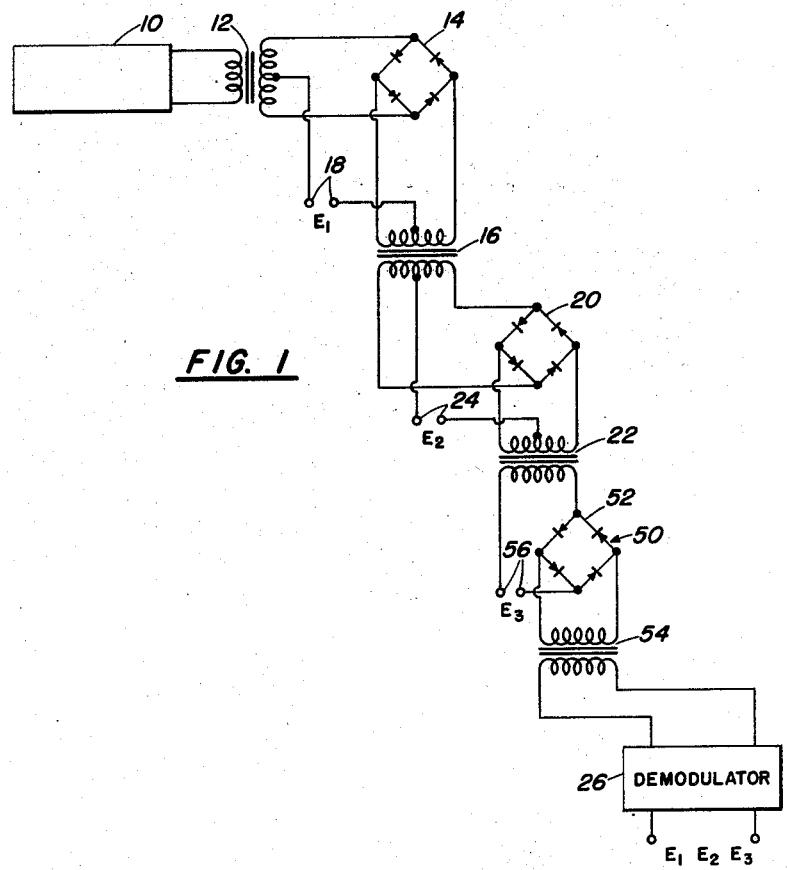
Fig. 1 shows a product-taking system in accordance with the invention.

Referring to Fig. 1, the product-taking system includes an oscillator 10 arranged to produce a carrier voltage $A \sin \omega t$ of substantially constant frequency. This oscillator may be of any suitable type, and the carrier frequency is preferably high enough so that the voltages to be multiplied do not introduce appreciable frequency distortion in the carrier. The output of oscillator 10 is applied through an input transformer 12, having a tapped secondary winding, to one diagonal of a conventional copper-oxide ring modulator 14. Output transformer 16, having tapped primary and secondary windings, is connected across the other diagonal of the ring modulator. The varying modulating voltage, designated $E_1$, is applied to the ring modulator through terminals 18, connected between the tap of the secondary winding of input transformer 12 and the tap of the primary winding of output transformer 16.

A consideration of the circuit connections just described will indicate that the output voltage appearing across the secondary winding of transformer 16 is proportional to $E_1 A \sin \omega t$. This voltage is applied to the input diagonal of a second ring modulator 20, and an output transformer 22, having a tapped primary winding, is connected across the other diagonal of this ring modulator. A second varying input voltage is applied to ring modulator 20 through terminals 24, connected between the tap of the secondary winding of transformer 16 and the tap of the primary winding of transformer 22. The voltage appearing across the secondary winding of transformer 22 is then proportional to $E_1 E_2 A \sin \omega t$. If it is desired to obtain only the product of the two voltages $E_1$ and $E_2$, demodulator 26 can be coupled across the secondary of transformer 22 to demodulate the signal at this point and thereby give the value $E_1 E_2$.

It will be understood that additional stages of ring modulators and associated circuits, such as shown generally at 50, may be added to provide means for obtaining output voltages proportional to the product of more than two input voltages, the circuit arrangements being exactly similar to those described above. More specifically, the secondary of transformer 22 is coupled across one of the diagonals of ring modulator 52. The other diagonal of ring modulator 52 has transformer 54 coupled across it. A voltage $E_3$ is applied to ring modulator 52 through terminals 56 which are connected between the tap of the secondary winding of transformer 22 and the tap of the primary winding of transformer 54. It may be necessary, in some cases, to provide buffer-amplifier stages between successive ring modulators to maintain the carrier amplitude within the efficient operating range of the ring modulators.

The output of the last of the ring modulators, in this case that of ring modulator 52, is demodulated by demodulator 26 to separate the product voltage from the carrier. While demodulator 26 may be of any suitable type, it may conveniently be a ring demodulator arranged to suppress the carrier and produce an output voltage proportional only to the product of the varying input voltages, this product in the present example being $E_1 E_2 E_3$.

Figure 2:
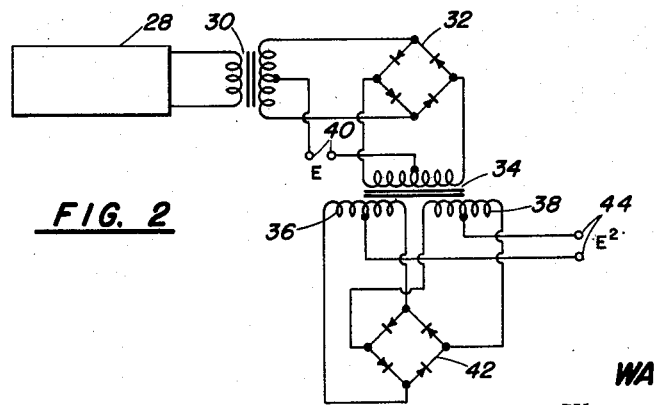
Fig. 2 shows a modification of the system of Fig. 1 which may be used to provide an output voltage proportional to the square of an input voltage.

It will be recognized that the system just described may be used equally well to obtain output voltages proportional to the square of a single input voltage or, through the use of additional stages, to higher powers of the input voltage. In this particular application, however, the system may be simplified with further savings in equipment. Such a simplified system is shown in Fig. 2 of the drawing.

In this system, oscillator 28, of the same general type as oscillator 10, is arranged to produce a constant-frequency carrier, $A \sin \omega t$. The output of this oscillator is applied through transformer 30, having a tapped secondary winding, to one diagonal of a ring modulator 32 across the other diagonal of which is connected an output transformer 34, provided with a tapped primary winding and two tapped secondary windings 36 and 38. The input voltage to be squared is applied through terminals 40, connected between the tap of the secondary winding of transformer 30 and the tap of the primary winding of transformer 34. The output of this circuit arrangement, which appears across each of secondary windings 36 and 38 of transformer 34, is proportional to $EA \sin \omega t$.

Secondary windings 36 and 38 are connected across the two diagonals of ring demodulator 42, respectively, the output of this demodulator appearing between the taps of secondary windings 36 and 38, which are connected to output terminals 44. This output is proportional only to $E_2$, the carrier having been totally suppressed in the ring demodulator.

I claim:

1. A system for producing an output voltage proportional to the product of two varying input voltages comprising a source of voltage of constant frequency, first and second ring modulators each having a pair of input and output terminals, a first transformer, means connecting the primary winding of said first transformer to said source, means connecting the secondary winding of said transformer to the input terminals of said first ring modulator, a second transformer, means connecting the primary winding of said second transformer across the output terminals of said first ring modulator, and means connecting the secondary windings of said second transformer across the input terminals of said second ring modulator, a demodulator circuit, a third transformer, means connecting the primary of said third transformer across the output terminals of said second ring modulator, and a means connecting the secondary windings of said third transformer to said demodulator, means for applying a first of said varying input voltages across a midpoint of the secondary of said first transformer and a midpoint of the primary of said second transformer, and means for applying the second of said varying input voltages across a midpoint of the secondary of said second transformer and the midpoint of the primary of said third transformer.

2. A system for producing an output voltage proportional to the product of a plurality of varying input voltages comprising a modulator for each of said plurality of varying input voltages, respectively, each of said modulators having an input circuit and an output circuit, means coupling said modulators in tandem whereby the voltage appearing in the output circuit of one modulator is impressed in the input circuit of a succeeding modulator, a constant frequency voltage source, means coupling said source to the first of said tandem connected modulators, means for impressing each of said varying voltages between the input and output circuits of a respective modulator, and means for demodulating the output of the last of said tandem connected modulators.

3. A system as defined in claim 2 wherein said modulators are ring modulators having a pair of input terminals and a pair of output terminals.

4. The invention as defined in claim 3 wherein said input circuits comprise, respectively, a center tapped transformer secondary winding and a respective pair of input terminals, and wherein said output circuits comprise, respectively, a center tapped transformer primary winding.

5. The invention as defined in claim 4 wherein each of said varying input voltages is applied, respectively, between the center taps of said transformers in the input and output circuits of said respective modulators.

6. A system for producing an output voltage proportional to the product of a plurality of varying input voltages comprising a ring modulator for each of said plurality of input voltages, means for producing a carrier voltage of substantially constant frequency, means for modulating said constant frequency voltage with a first of said input voltages, means for connecting the remaining of said modulators whereby each is arranged to modulate the output of a proceeding modulator with an individual successive input voltage, and a demodulator for separating the carrier voltage from the output of the final modulator.

References Cited in the file of this patent

UNITED STATES PATENTS

| | | |
|---|---|---|
| 1,578,679 | Peterson | Mar. 30, 1926 |
| 1,633,100 | Heising | June 21, 1927 |
| 1,831,516 | Stewart | Nov. 10, 1931 |
| 1,998,115 | Black | Aug. 16, 1935 |
| 2,136,606 | Bendel | Nov. 15, 1938 |
| 2,229,433 | Arzmaier | Jan. 21, 1941 |
| 2,244,369 | Martin | June 3, 1941 |
| 2,362,898 | Gilman | Nov. 14, 1944 |

FOREIGN PATENTS

| | | |
|---|---|---|
| 537,731 | Great Britain | July 3, 1941 |

OTHER REFERENCES

"The Modulator" by Hellman in Electronics, March 1938, pages 28–30.